(12) United States Patent
Wang et al.

(10) Patent No.: US 11,871,300 B2
(45) Date of Patent: Jan. 9, 2024

(54) POSITIONING METHOD, POSITIONING DEVICE AND SYSTEM, ELECTRONIC EQUIPMENT AND COMPUTER-READABLE MEDIUM

(71) Applicant: BOE TECHNOLOGY GROUP CO., LTD., Beijing (CN)

(72) Inventors: Youxue Wang, Beijing (CN); Xiaohui Ma, Beijing (CN); Kai Geng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 94 days.

(21) Appl. No.: 17/355,362

(22) Filed: Jun. 23, 2021

(65) Prior Publication Data

US 2021/0409905 A1 Dec. 30, 2021

(30) Foreign Application Priority Data

Jun. 30, 2020 (CN) .......................... 202010614962.1

(51) Int. Cl.
*H04W 4/029* (2018.01)
*G01S 5/02* (2010.01)

(52) U.S. Cl.
CPC ........... *H04W 4/029* (2018.02); *G01S 5/0289* (2013.01)

(58) Field of Classification Search
CPC .................................................... H04W 4/029
USPC ............. 455/456, 414.1, 415, 41.2, 411, 406
See application file for complete search history.

(56) References Cited

U.S. PATENT DOCUMENTS

| | | | | |
|---|---|---|---|---|
| 2017/0331577 | A1* | 11/2017 | Parkvall | H04W 4/00 |
| 2017/0331670 | A1* | 11/2017 | Parkvall | H04J 11/0056 |
| 2020/0229206 | A1* | 7/2020 | Badic | H04W 40/22 |
| 2022/0163969 | A1* | 5/2022 | Li | G05D 1/0289 |
| 2022/0311488 | A1* | 9/2022 | Shreevastav | H04B 7/0408 |

\* cited by examiner

*Primary Examiner* — Joseph Arevalo
(74) *Attorney, Agent, or Firm* — HOUTTEMAN LAW LLC

(57) ABSTRACT

The embodiment of the present disclosure provides a positioning method, a positioning device and system, an electronic equipment and a computer readable medium. The positioning method comprises: establishing connection with a target node in response to feedback information returned by the target node; acquiring initial position information; acquiring real-time position information for multiple times; and positioning the target node according to the acquired initial position information and the real-time position information acquired for multiple times. wherein the real-time position information comprises the direction and the distance of the movement of the source node relative to the last position of the source node, the direction and the distance of the movement of the target node returned by the target node relative to the last position of the target node, and the distance between the target node and the source node.

20 Claims, 6 Drawing Sheets

POSITIONING METHOD, POSITIONING DEVICE AND SYSTEM, ELECTRONIC EQUIPMENT AND COMPUTER-READABLE MEDIUM

CROSS REFERENCE TO RELATED APPLICATION

This application claims the priority of the Chinese patent application No. 202010614962.1, filed on Jun. 30, 2020, the contents of which are incorporated herein by reference in their entirety.

TECHNICAL FIELD

The present disclosure relates to the field of communication technology, and in particular, to a positioning method, a positioning device, a positioning system, an electronic equipment, and a computer-readable medium.

BACKGROUND

In the related art of the positioning method, an object is usually positioned based on a satellite signal. In the related art, the object is usually three-point positioned by three different reference points, but in a practical application situations, it may be difficult to position the object.

SUMMARY

The technical solution of the embodiment of the present disclosure relates to a positioning method, comprising:
  establishing, in response to feedback information returned by the target node according to a positioning request sent by a source node, connection with a target node;
  acquiring initial position information, wherein the initial position information comprises the initial position of the source node and the distance between the source node and the target node;
  acquiring real-time position information for multiple times, wherein each of the real-time position information comprises the direction and the distance of the movement of the source node relative to the last position of the source node, the direction and the distance of the movement of the target node returned by the target node relative to the last position of the target node, and the distance between the target node and the source node, wherein the last position information of the source node and the target node is acquired through the following steps: (a) the initial position information acquiring step, or (b) last real-time position information acquiring step; and
  positioning the target node according to the acquired initial position information and at least two of the real-time position information acquired for multiple times; wherein
  in each acquired real-time position information, at least one of the following position information is different from the corresponding position information acquired last time: the direction of the movement of the source node relative to the last position of the source node, the distance of the movement of the source node relative to the last position of the source node, the direction of the movement of the target node relative to the last position of the target node, and the distance of the movement of the target node relative to the last position of the target node.

Optionally, establishing, in response to feedback information returned by the target node according to a positioning request sent by a source node, connection with a target node comprises:
  sending a positioning request to a measurement range; and
  receiving feedback information returned by the target node in response to the positioning request, and establish connection with the target node according to the feedback information.

Optionally, in the step of sending a positioning request to a measurement range, a first range value, a first positioning manner and a second positioning manner are set, wherein a positioning range of the first positioning manner is larger than a positioning range of the second positioning manner; if the measurement range is larger than the first range value, the first positioning manner is used to send the positioning request, and if the measurement range is smaller than the first range value, the second positioning manner is used to send the positioning request.

Optionally, in the step of sending a positioning request to a measurement range, a second range value, a manner and a thirdly positioning manner are set, wherein a positioning range of the thirdly positioning manner is larger than a positioning range of the second positioning manner, if the measurement range is larger than the first range value, the first positioning manner is used to send the positioning request, and if the measurement range is smaller than the first range value and greater than the second range value, the second positioning manner is used to send the positioning request, and if the measurement range is smaller than the second range value, the thirdly positioning manner is used to send the positioning request.

Optionally, in the step of acquiring real-time position information for multiple times, acquiring the distance between the target node and the source node further comprises:
  sending a first measurement signal to the target node;
  receiving a first reply signal, wherein the first reply signal is a signal returned by the target node after receiving the first measurement signal;
  acquiring a first transceiving time length, wherein the first transceiving time length is the time length from the sending of the first measurement signal to the receiving of the first reply signal; and
  determining, according to the first transceiving time length and the transmission speeds of the first measurement signal and the first reply signal, the distance between the source node and the target node.

Optionally, after the step of sending the first measurement signal to the target node, further comprising:
  sending a second measurement signal to the target node at a first sending interval duration;
  receiving a first receiving time length returned by the target node, wherein the first receiving time length is determined by the target node and is the time length between the target node receiving the first measurement signal and the target node receiving the second measurement signal; and
  comparing the first receiving time length with the first sending interval duration, and determining a first time difference between the source node and the target node for sending and receiving signals.

Optionally, after the step of comparing the first receiving time length with the first sending interval duration, and determining a first time difference between the source node and the target node for sending and receiving signals, further comprising:

receiving a second reply signal, wherein the second reply signal is a signal sent by the target node at an interval of a second sending interval duration after the first reply signal is sent;

determining a second receiving time length, wherein the second receiving time length is a time length between receiving the first reply signal and receiving the second reply signal; and comparing the second receiving time length with the second sending interval duration, and determining a second time difference between the source node and the target node for sending and receiving signals.

Optionally, positioning the target node according to the acquired initial position information and at least two of the real-time position information acquired for multiple times further comprises:

establishing a coordinate system with the acquired initial position of the source node as the origin;

determining the coordinate corresponding to the acquired position of the source node according to the acquired direction and distance of the movement of the source node relative to the last position of the source node, and translate the coordinate of the source node according to the direction and distance of the movement of the target node relative to the last position of the target node, so as to obtain the translation coordinate of the source node;

repeating the last step, and obtaining translation coordinates corresponding to each of the source nodes based on the real-time position information acquired each time;

calculating, according a first algorithm and the translation coordinates corresponding to the position of the source node and the distance between the source node and the target node in the real-time position information acquired for multiple times, coordinates corresponding to the position of the target node, so as to position the target node.

Optionally, the first algorithm is the following system of equations:

$$(x-x_1)^2 + (y-y_1)^2 + (z-z_1)^2 = d_1^2$$
$$(x-x_2)^2 + (y-y_2)^2 + (z-z_2)^2 = d_2^2$$
$$(x-x_3)^2 + (y-y_3)^2 + (z-z_3)^2 = d_3^2$$
$$\ldots$$
$$(x-x_n)^2 + (y-y_n)^2 + (z-z_n)^2 = d_n^2$$

wherein $x_1, x_2, \ldots x_n$, and $y_1, y_2, \ldots y_n$, and $z_1, z_2, \ldots z_n$ are respectively horizontal, longitudinal, and vertical axis coordinates of a translation coordinate corresponding to the position of the source node in the acquired real-time position information; $d_1, d_2 \ldots$ and $d_n$ are the distance between the source node and the target node in the real-time position information acquired at each time; and x, y and z are respectively horizontal axis coordinate, longitudinal axis coordinate and vertical axis coordinate corresponding to the position of the target node.

Optionally, in the set of equations of the first algorithm, n=3, and the first algorithm is the following system of equations:

$$(x-x_1)^2+(y-y_1)^2+(z-z_1)^2=d_1^2$$
$$(x-x_2)^2+(y-y_2)^2+(z-z_2)^2=d_2^2$$
$$(x-x_3)^2+(y-y_3)^2+(z-z_3)^2=d_3^2.$$

Correspondingly, an embodiment of the present disclosure further provides a positioning device, comprising:

a connection establishing component configured to establish, in response to the feedback information returned by the target node according to a positioning request sent by the source node, a connection with the target node;

an initial information acquiring component configured to acquire initial position information, wherein the initial position information comprises an initial position of a source node and a distance between the source node and a target node;

a real-time position information acquiring component configured to acquire real-time position information after the initial position information acquiring component acquires the initial position information, wherein the real-time position information comprises the direction and the distance of the movement of the source node relative to the last position of the source node, the direction and the distance of the movement of the target node returned by the target node relative to the last position of the target node, and the distance between the target node and the source node, wherein the last position information of the source node and the target node is acquired through the following components: (a) the initial information acquiring component, or (b) the real-time position information acquiring component; and a positioning calculating component configured to position the target node according to the initial position information acquired by the initial information acquiring component, and the real-time position information acquired by the real-time position information acquiring component for multiple times; wherein, in each acquired real-time position information, at least one of the following position information is different from the corresponding position information acquired last time: the direction of the movement of the source node relative to the last position of the source node, the distance of the movement of the source node relative to the last position of the source node, the direction of the movement of the target node relative to the last position of the target node, and the distance of the movement of the target node relative to the last position of the target node.

Optionally, the connection establishing component is further configured to send a positioning request to a measurement range, and receive feedback information returned by the target node in response to the positioning request, and establish connection with the target node according to the feedback information.

Optionally, the initial information acquiring component or the real-time position information acquiring component at the source node sends a first measurement signal to the target node and receives a first reply signal, wherein the first reply signal is a signal returned by the target node after the target node receiving the first measurement signal. the positioning calculating component is further configured to acquire a first transceiving time length, wherein the first transceiving time length is the time length from the sending of the first measurement signal to the receiving of the first reply signal, and positioning calculating component is further configured to determine, according to the first transceiving time length and the transmission speeds of the first measurement signal and the first reply signal, the distance between the source node and the target node.

Optionally, the initial information acquiring component or the real-time position information acquiring component is further configured to send the second measurement signal to the target node according to a first sending interval duration, receiving a first receiving time length returned by the target node, wherein the first receiving time length is determined by the target node and is the time length between the target node receiving the first measurement signal and the target node receiving the second measurement signal; the positioning calculating component is further configured to compare the first receiving time length with the first sending interval duration, and determine a first time difference between the source node and the target node for sending and receiving signals.

Optionally, the initial information acquiring component or the real-time position information acquiring component is further configured to receive a second reply signal, wherein the second reply signal is a signal sent by the target node at an interval of a second sending interval duration after the first reply signal is sent. The positioning calculating component is further configured to determine a second receiving time length, wherein the second receiving time length is a time length between receiving the first reply signal and receiving the second reply signal, compare the second receiving time length with the second sending interval duration, and determine a second time difference between the source node and the target node for sending and receiving signals.

Optionally, the positioning calculating component is further configured to: establishing a coordinate system with the acquired initial position of the source node as the origin; determine the coordinate corresponding to the acquired position of the source node according to the acquired direction and distance of the movement of the source node relative to the last position of the source node, and translate the coordinate of the source node according to the direction and distance of the movement of the target node relative to the last position of the target node, so as to obtain the translation coordinate of the source node; obtain translation coordinates corresponding to each of the source nodes based on the real-time position information acquired each time; and calculating, according a first algorithm, and the translation coordinates corresponding to the position of the source node and the distance between the source node and the target node in the real-time position information acquired for multiple times, coordinates corresponding to the position of the target node, so as to position the target node.

Optionally, the first algorithm adopted by the positioning calculating component is an equation described in the above positioning method.

Correspondingly, an embodiment of the present disclosure further provides a positioning system, which comprises the above positioning device.

Correspondingly, an embodiment of the present disclosure further provides an electronic equipment, comprising:
one or more processors;
a memory storing one or more programs, when the one or more programs is executed by the one or more processors, to implement any of the above positioning methods by the one or more processors; and
one or more I/O interfaces connected between the processor and the memory, and the I/O interface is configured to realize the information interaction between the processor and the memory.

Correspondingly, an embodiment of the present disclosure further provides a computer readable medium, wherein computer readable medium stores computer program, and the computer program is executed by a processor to implement the above positioning method.

DETAILED DESCRIPTION OF THE EMBODIMENTS

Figure 1:
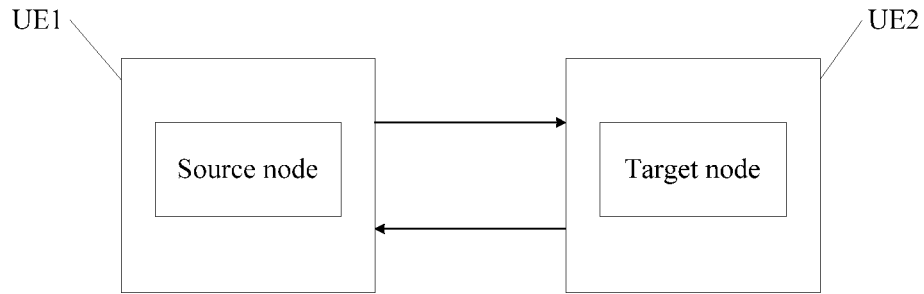
FIG. 1 is a system diagram of a positioning system according to an embodiment of the present disclosure.

The embodiments of the present disclosure will be described more fully hereinafter with reference to the accompanying drawings, but the illustrated embodiments can be embodied in different forms, and should not be construed as limited to the embodiments set forth herein. Rather, the purpose of providing the embodiments is to make the present disclosure thorough and complete, and to enable those skilled in the art to fully understand the scope of the present disclosure.

The accompanying drawings are included to provide a further understanding of the embodiments of the disclosure, and are incorporated in and constitute a part of this specification, and together with the embodiments of the disclosure serve to explain the principles of the disclosure, and are not limited herein. The above and other features and advantages will become more apparent to those skilled the art by describing in detail exemplary embodiments thereof with reference to the attached drawings, in which The embodiments of the present disclosure can be described with reference to plan views and/or cross-sectional views by way of idealized schematic diagrams of the present disclosure. Accordingly, the example illustrations can be modified according to manufacturing techniques and/or tolerances.

In the absence of conflict, the various embodiments and features of the embodiments of the present disclosure can be combined with each other.

The terms used in the present disclosure are used only to describe particular embodiments and are not intended to limit the present disclosure. The term "and/or" as used in the present disclosure comprises any and all combinations of one or more of the related listed items. The singular forms "a", "an" and "the" as used in the present disclosure are also intended to comprise the plural forms, unless the context clearly indicates otherwise. The terms "comprises", "made of" as used in the present disclosure specify the presence of stated features, integers, steps, operations, elements, and/or components, but do not preclude the presence or addition of one or more other features, integers, steps, operations, elements, components, and/or groups thereof.

Unless otherwise defined, all terms (comprising technical and scientific terms) used in the present disclosure have the same meaning as commonly understood by one of ordinary skill in the art. It will be further understood that terms, such as those defined in commonly used dictionaries, should be interpreted as having meanings consistent with their meaning in the relevant art and in the background of the present disclosure, and will not be interpreted in an idealized or overly formal meaning unless expressly so defined herein.

The disclosed embodiments are not limited to the embodiments shown in the drawings, but comprise modifications of configurations formed based on a manufacturing process. Thus, the regions illustrated in the drawings have schematic properties, and the shapes of the regions shown in the drawings illustrate specific shapes of regions of elements, but are not intended to be limiting.

In the prior art of the positioning method, an object is usually positioned based on a satellite signal. However, if an object enters an area where satellite signals are weak, the object cannot be positioned. Further, in the related art, the object is usually three-point positioned by three different reference points. However, in practical application situations, three valid reference points may not exist for assisting positioning. For example, it is difficult to position an object in the following situations: two moving ships sail in an abyssal region, and the two ships are close to each other; or the situation that when different vehicles enter an area with weak satellite signals, these vehicles need to find each other, and the like.

FIG. 1 is a system diagram of a positioning system according to an embodiment of the present disclosure. As shown in FIG. 1, taking two user equipments (UE 1 and UE 2) to perform positioning as an example, a first user equipment UE1 comprises a source node (positioning node), and a second user equipment UE2 comprises a target node (positioned node), and the source node establishes a connection with the target node to perform positioning. Both the source node and the target node have the functions of radio frequency signal transmission and radio frequency signal reception.

Figure 2:
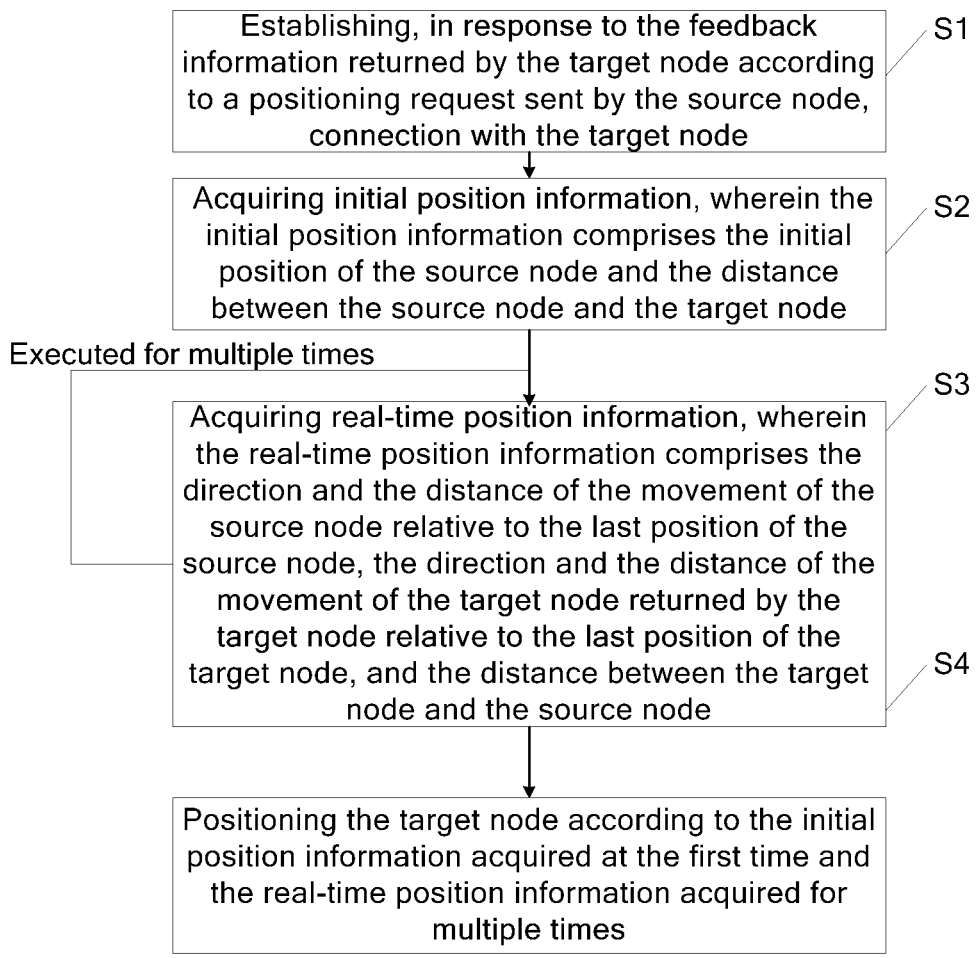
FIG. 2 is a flowchart of a positioning method according to an embodiment of the present disclosure.

FIG. 2 is a flowchart of a positioning method according to an embodiment of the present disclosure. As shown in FIG. 2, the positioning method comprises the following steps Step S1, establishing, in response to the feedback information returned by the target node according to a positioning request sent by the source node, connection with the target node.

Figure 3:
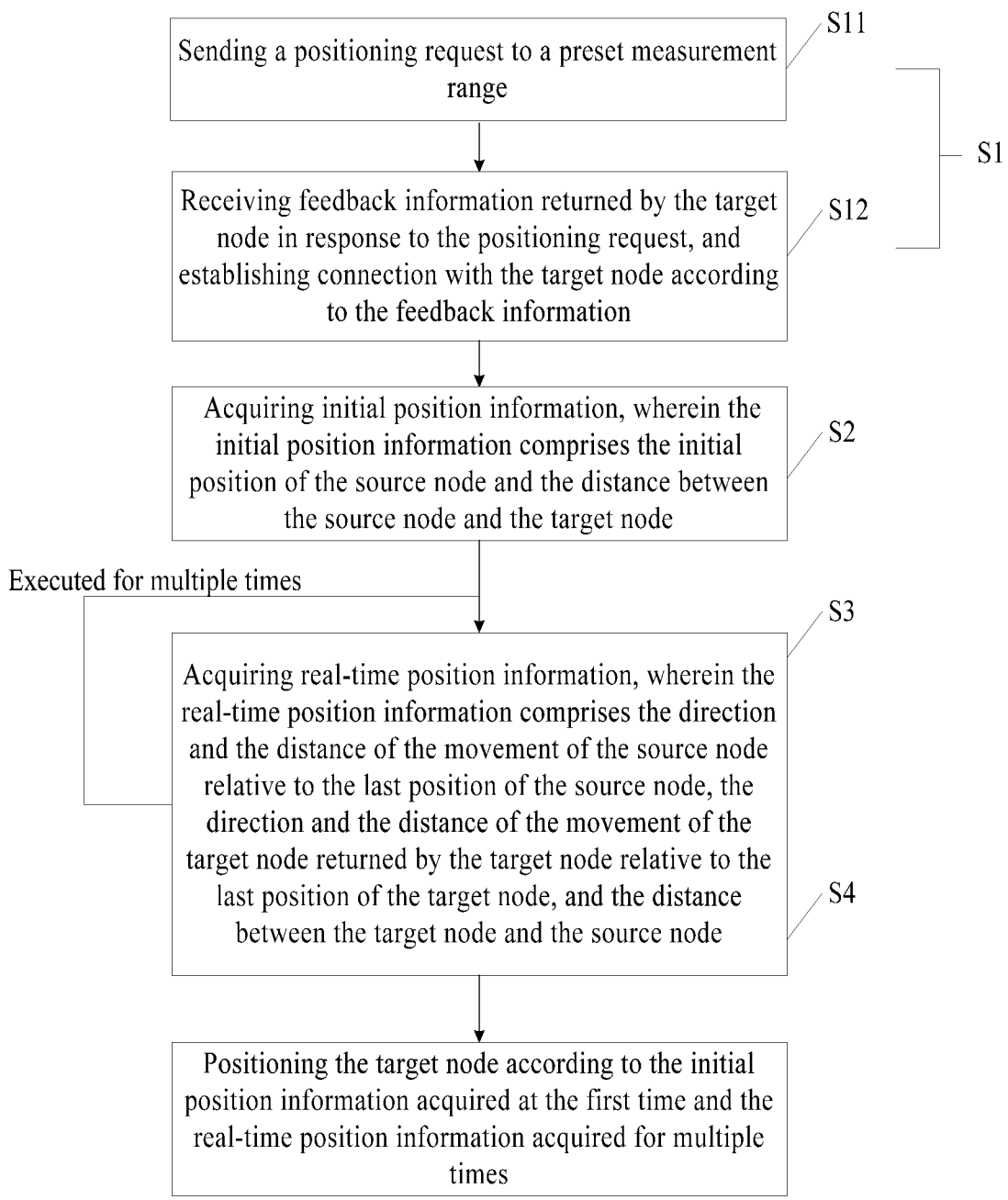
FIG. 3 is a flowchart illustrating a part of steps in a positioning method according to an embodiment of the present disclosure.

Specifically, as shown in FIG. 3, if the source node needs positioning, the source node needs to establish a connection with the target node. Specifically, the step S1 can comprise:

Step S11, sending a positioning request to a preset measurement range.

The source node sends a positioning request to all directions (i.e., 360°) within a preset measurement range. The preset measurement range can be determined according to the actual situations of the application positioning and the performance of the equipment for transmitting the signal. Optionally, a first preset range value can also be preset. If the range to be positioned is large, that is, if the preset measurement range is larger than the first preset range value, for example, positioning is performed in a mountain or on the sea, the positioning request is sent by adopting radar waves; and if the range to be positioned is small, that is, if the preset measurement range is smaller than or equal to the first preset range value, for example, positioning is performed indoors, the positioning request is sent by adopting ultrasonic waves. In other words, the positioning request can be sent by using a first positioning manner or a second positioning manner, wherein a positioning range of the first positioning manner is larger than a positioning range of the second positioning manner. If the preset measurement range is larger than the first preset range value, the first positioning manner is used to send the positioning request; and if the preset measurement range is smaller than the first preset range value, the second positioning manner is used to send the positioning request. Optionally, a second preset range value and the like can also be preset, which are not limited herein. Optionally, the second preset range value is smaller than the first preset range value. If the preset measurement range is larger than the first preset range value, the positioning request is sent by adopting radar waves; if the preset measurement range is smaller than or equal to the first preset range value and larger than the second preset range value, the positioning request is sent by adopting ultrasonic waves; and if the preset measurement range is smaller than or equal to the second preset range value, the positioning request is sent by adopting Bluetooth, which are not limited herein. In other words, the positioning request can also be sent by adopting a third positioning manner, wherein a positioning range of the third positioning manner is smaller than a positioning range of the second positioning manner. If the preset measurement range is larger than the first preset range value, the first positioning manner is used to send the positioning request; if the preset measurement range is smaller than the first preset range value and greater than the second preset range value, the second positioning manner is used to send the positioning request; and if the preset measurement range is smaller than the second preset range value, the thirdly positioning manner is used to send the positioning request.

Step S12, receiving feedback information returned by the target node in response to the positioning request, and establishing connection with the target node according to the feedback information.

After the source node sends a positioning request to all directions in the measurement range, if a target node in the measurement range receives the positioning request and agrees to positioning, the target node returns feedback information to the source node. After receiving the feedback information returned by the target node, the source node establishes connection with the target node according to the feedback information, so as to position.

Step S2, acquiring initial position information, wherein the initial position information comprises the initial position of the source node and the distance between the source node and the target node.

Specifically, when initial position information is acquired at the first time, the current initial position of the source node and the distance between the target node and the source node during the acquisition are recorded. Obtaining the distance between the target node and the source node means that, obtaining the target node which is possibly positioned on the circumference of a circle with the initial position of the source node as the center of the circle and the distance between the source node and the target node as the radius. The initial position of the source node can serve as a first reference point for positioning the target node.

Step S3, acquiring real-time position information, wherein the real-time position information comprises the direction and the distance of the movement of the source node relative to the last position of the source node, the direction and the distance of the movement of the target node returned by the target node relative to the last position of the target node, and the distance between the target node and the source node.

After the initial position information is acquired at the first time, step S3 can be repeated to acquire real-time position information for multiple times, so as to obtain multiple real-time position information. The last position information of the source node and the target node is acquired through the following steps: (a) an initial position information acquiring step, or (b) a last real-time position information acquiring step. During the process of the movement of the source node and/or the target node, the measuring devices (such as gyroscopes) corresponding to the source node and/or the target node respectively record the direction and distance of the movement of the source node and the target node. When the real-time position information is acquired every time after the initial position information is acquired at the first time, according to the direction and the distance of the movement of the current position of the source node relative to the position of the source node in the real-time position information acquired last time, the current position of the source node can be acquired. Then, the direction and distance of the movement of the current position of the target node relative to the position of the target node when the real-time position information was acquired last time, which is recorded by the target node, is returned by the target node and is received by the source node. Therefore, the current distance between the target node and the source node is acquired.

It should be noted that, each time the real-time position information is acquired, the position of at least one of the target node and the source node changes relative to the real-time position information acquired last time. In other words, at least one of the target node and the source node is moving. That is, in each acquired real-time position information, at least one of the following position information is different from the corresponding position information acquired last time: the direction of the movement of the source node relative to the last position of the source node, the distance of the movement of the source node relative to the last position of the source node, the direction of the movement of the target node relative to the last position of the target node, and the distance of the movement of the target node relative to the last position of the target node. Further, in the present disclosure, the initial position information is acquired by the initial information acquiring module, and the real-time position information is acquired by the real-time position information acquiring module. Optionally, the initial information acquiring module and the real-time information acquiring module can be integrated in the measurement device.

Step S4, positioning the target node according to the initial position information acquired at the first time and the real-time position information acquired for multiple times.

At least one of the target node and the source node is moving during the positioning. Therefore, the position of the source node acquired each time can serve as a new reference point, so that the real-time position information can be acquired for multiple times, and a plurality of reference points can be obtained. The target node is positioned according to the position relationship between the plurality of reference points and the target node. Typically, more than three reference points are required to position the target node. Accordingly, by using the source node and/or the target node in the movement, the positioning method according to the present embodiment uses different positions of the source node as different reference points, so that the target node can be positioned only by the source node. For example, the target node can be positioned only by the distance between the source node and the target node and the respective movement trends of the source node and the target node. The positioning method according to the present embodiment greatly simplifies the conditions required for positioning the target node. Therefore, the present disclosure can provide a positioning method which is reliable, easy to implement and suitable for various application environments.

Figure 4:
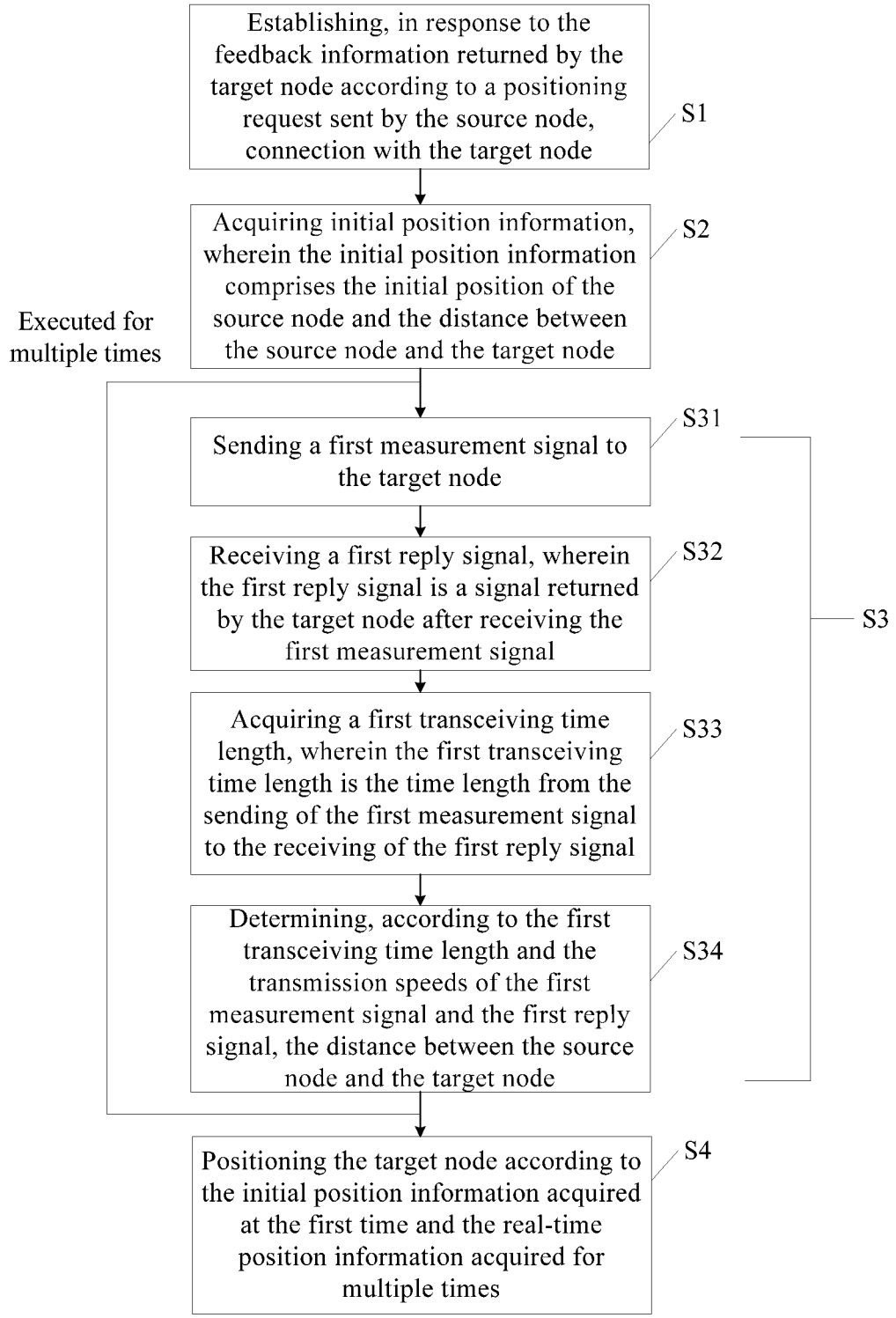
FIG. 4 is a flowchart illustrating a part of steps in a positioning method according to an embodiment of the present disclosure.

Optionally, as shown in FIG. 4, in the step S3, the acquired direction and distance of the movement of the source node relative to the last position of the source node can be recorded by a measuring device corresponding to the source node. The acquired direction and distance of the movement of the target node relative to the last position of the target node can be recorded by a measuring device corresponding to the target node and then returned to the source node. Further, in step S3, the step of acquiring the distance between the target node and the source node can further comprises:

Step S31, sending a first measurement signal to the target node.

Step S32, receiving a first reply signal, wherein the first reply signal is a signal returned by the target node after receiving the first measurement signal.

Step S33, acquiring a first transceiving time length, wherein the first transceiving time length is the time length from the sending of the first measurement signal to the receiving of the first reply signal.

Step S34, determining, according to the first transceiving time length and the transmission speeds of the first measurement signal and the first reply signal, the distance between the source node and the target node.

Specifically, the source node sends the first measurement signal to the target node, and starts timing, and the target node immediately sends the first reply signal to the source node after receiving the first measurement signal, and the source node stops timing after receiving the first reply signal, so as to obtain a first transceiving time length t1. The first transceiving time length t1 is the time length between the source node sending the first measurement signal and the source node receiving the first reply signal returned by the target node. The first transceiving time length t1 contains the time spent for the travel of the first measurement signal from the source node to the target node, and the time spent for the travel of the first reply signal from the target node back to the source node. Optionally, the signal in the present disclosure (comprising the first measurement signal and the first reply signal) can be an electromagnetic wave signal. By multiplying the propagation speed of the electromagnetic wave signal in the air being 3×108 m/s, by one half of the first transceiving time length t1, it can be determined that the distance between the source node and the target node is d=(t1/2)×3×108 m. In order to increase the reliability of the measured distance, steps S31 to S34 can also be repeated to measure the distance between the source node and the target node for multiple times, and then the distances measured for multiple times are averaged, and the averaged distance is adopt as the distance between the target node and the source node in the currently acquired real-time position information.

Since different user equipments have different clocks (i.e., timers), there are clock errors between different user equipments. Optionally, in order to calculate the clock error, taking the source node sending a signal and the target node receiving a signal as an example, after the step of sending the first measurement signal to the target node (S31), the method can further comprises the following steps:

Step S301, sending a second measurement signal to the target node at a preset sending interval duration.

Step S302, receiving a first receiving time length returned by the target node, wherein the first receiving time length is determined by the target node and is the time length between the target node receiving the first measurement signal and the target node receiving the second measurement signal.

Step S303, comparing the first receiving time length with the sending interval duration, and determining a first time difference t11 between the source node and the target node for sending and receiving signals.

Optionally, sending interval duration, such as 1000 ms, can be preset as a reference time length for comparing the clock error of the first user equipment with the second user equipment. After the source node sends the first measurement signal to the target node, the second measurement signal is sent to the target node again at an interval of 1000 ms. The target node starts timing when receiving the first measurement signal and stops timing when receiving the second measurement signal, and a first receiving time length t2 is obtained. The first receiving time length t2 is a time length between the target node receiving the first measurement signal sent by the source node and the target node receiving the second measurement signal sent by the source node. By comparing the difference between the first receiving time length t2 and the preset sending interval time duration (e.g. 1000 ms), the clock error, i.e. the first time difference t11, between the first user equipment corresponding to the source node and the second user equipment corresponding to the target node can be determined.

Similarly, alternatively, taking the example that the target node sends a signal and the source node receives a signal, the clock error can be calculated again, and after the step S32 of receiving the first reply signal, the method further comprises the following steps:

Step S321, receiving a second reply signal, wherein the second reply signal is a signal sent by the target node at an interval of a preset sending interval duration after the first reply signal is sent.

Step S322, determining a second receiving time length, wherein the second receiving time length is a time length between receiving the first reply signal and receiving the second reply signal.

Step S323, comparing the second receiving time length with the sending interval duration, and determining a second time difference t12 between the source node and the target node for sending and receiving signals.

Optionally, the sending interval duration in step S321 can be preset to be the same as the sending interval duration in step S301, for example, 1000 ms. After the target node sends the first reply signal to the source node, sending the second reply signal to the source node at an interval of 1000 ms. The source node starts timing when receiving the first reply signal and stops timing when receiving the second reply signal, and a second receiving time length t3 is obtained. The second receiving time length t3 is a time length between the source node receiving the first reply signal sent by the target node and the target node receiving the second reply signal sent by the source node. By comparing the difference between the second receiving time length t3 and the preset sending interval time duration (e.g. 1000 ms), the clock error, i.e. the second time difference t12, between sending the signal by the second user equipment corresponding to the target node and receiving the signal by the first user equipment corresponding to the source node can be determined.

After determining the first time difference and the second time difference, the positioning result can be optimized in the following process.

It should be noted that, in the step S2 of acquiring the initial position information, the step of acquiring the distance between the source node and the target node is the same as the step S3 of acquiring the distance between the source node and the target node, that is, is the same as the steps described in steps S31 to S34.

Figure 5:
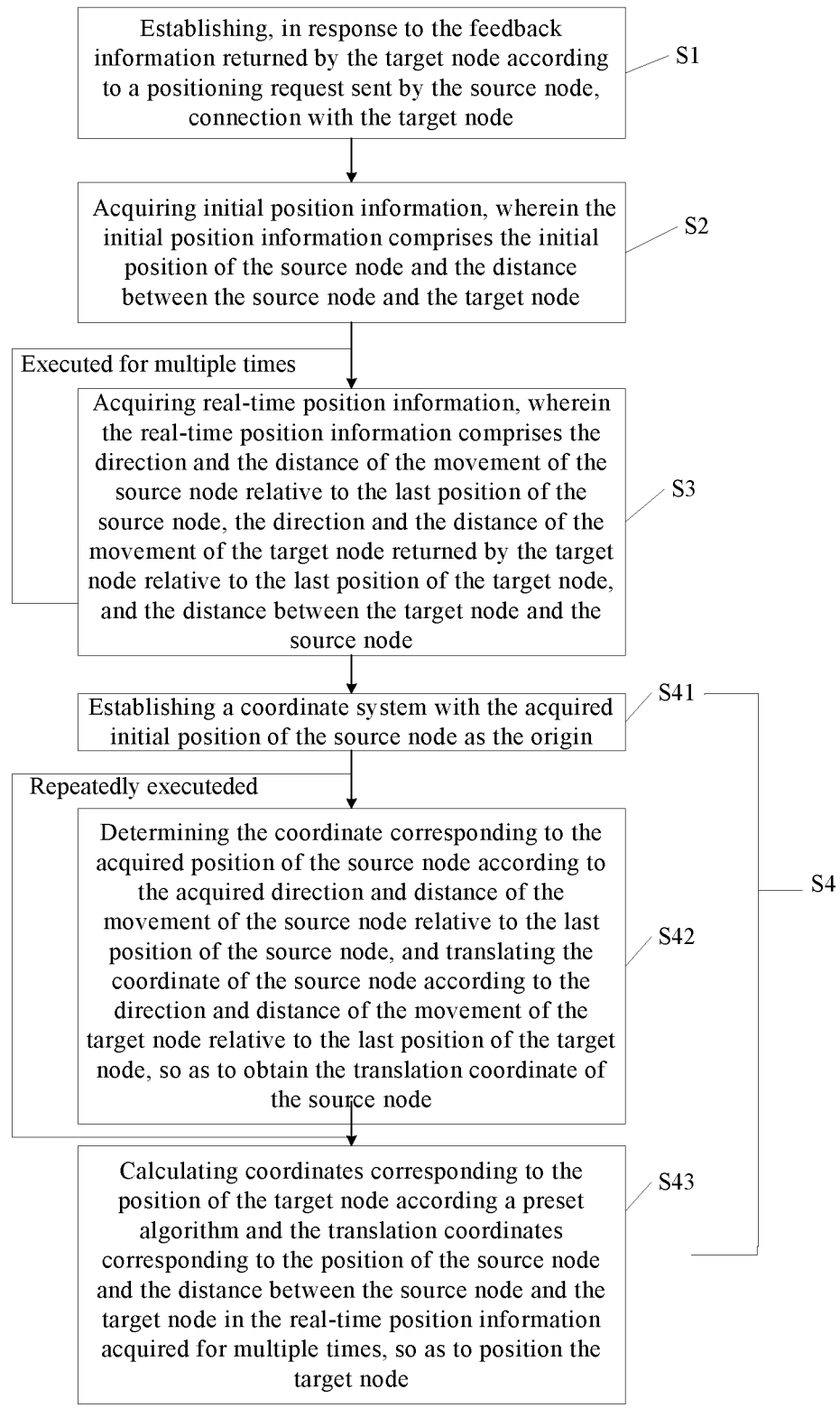
FIG. 5 is a flowchart illustrating a part of steps in a positioning method according to an embodiment of the present disclosure.
Figure 6:
FIG. 6 is a schematic diagram illustrating a translation step in a positioning method according to an embodiment of the present disclosure.
Figure 7:
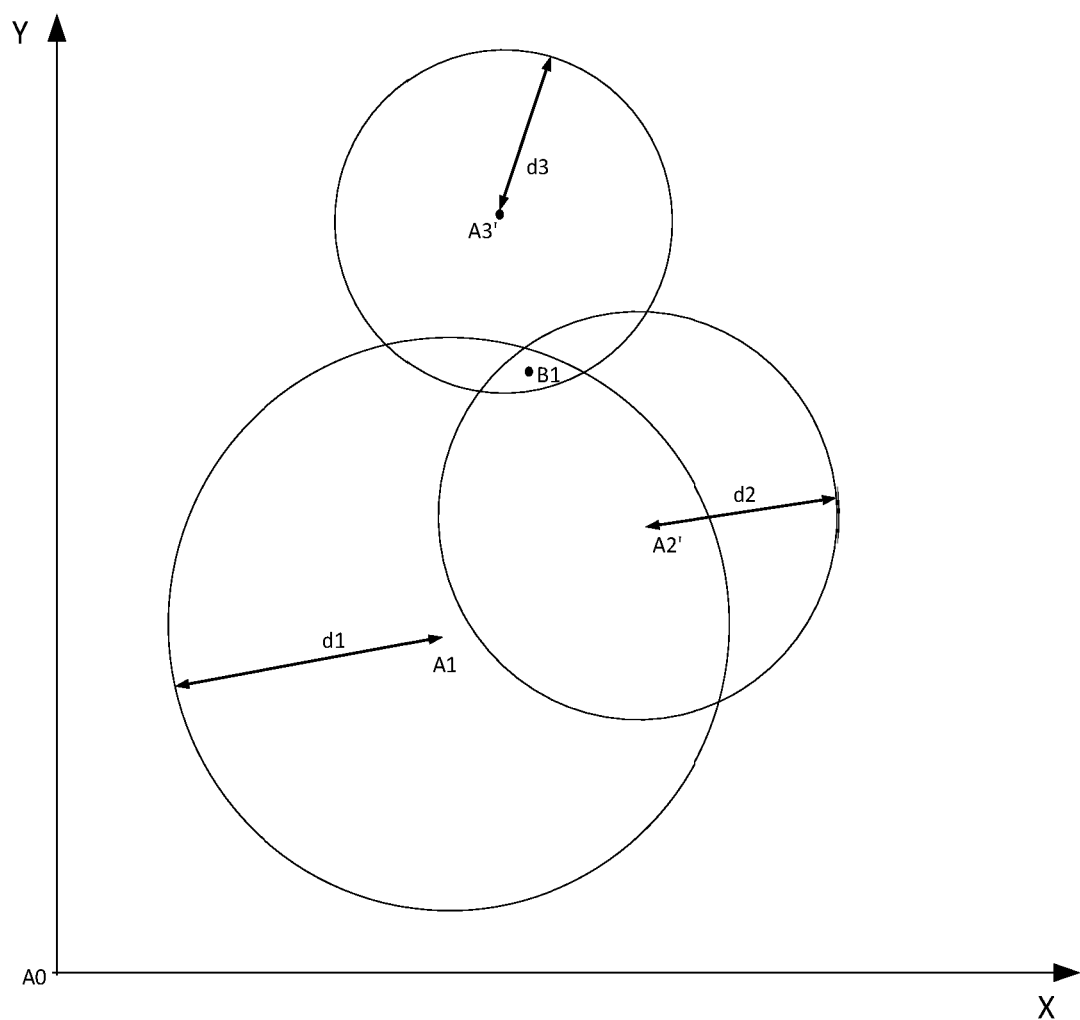
FIG. 7 is a schematic diagram of three-point positioning in a positioning method according to an embodiment of the present disclosure.

Optionally, as shown in FIGS. 5 to 7, the step (S4) of positioning the target node according to the initial position information acquired at the first time and the real-time position information acquired for multiple times can comprise:

Step S41, establishing a coordinate system with the acquired initial position of the source node as the origin.

Establishing a coordinate system with the initial position of the source node in the initial position information acquired at the first time as the origin of the coordinate system. If the source node and the target node are located at the same altitude, they can be regarded as moving in the same plane, and a plane coordinate system can be established. That is, the coordinate of the initial position of the source node is (0, 0). If the source node and the target node are located at different altitudes, a spherical coordinate system can be established, which comprising the x-axis, y-axis, and z-axis that are perpendicular to each other. That is, the coordinate of the initial position of the source node is (0, 0, 0).

Step S42, determining the coordinate corresponding to the acquired position of the source node according to the acquired direction and distance of the movement of the source node relative to the last position of the source node, and translating the coordinate of the source node according to the direction and distance of the movement of the target node relative to the last position of the target node, so as to obtain the translation coordinate of the source node.

According to the direction and the distance of the movement of the source node relative to the last position of the source node in the currently acquired real-time position information, the coordinate corresponding to the position of the source node in the currently acquired real-time position information can be determined. For convenience of explanation, the second and third times for acquiring real-time position information are taken as an example and described with reference to FIG. 6, and FIG. 6 is a schematic diagram of the translation step. In FIG. 6, A1 is the position of the source node in the real-time position information acquired at the second time, and d1 is the distance between the position A1 of the source node and the position of the target node in the real-time position information acquired at the second time. Based on above, when the real-time position information is acquired at the second time, the position of the target node on the circumference of a circle with the position A1 of the source node as the center and d1 as the radius, assuming that the position of the target node is B1. A2 is the position of the source node in the real-time position information acquired at the thirdly time, and d2 is the distance between the position A2 of the source node and the position of the target node in the real-time information acquired at the thirdly time. Based on above, when the real-time position information is acquired at the thirdly time, the position of the target node on the circumference of a circle with the position A2 of the source node as the center and d2 as the radius, assuming that the position of the target node is B2. Since the position of the source node in the real-time position information acquired at the thirdly time is used as the reference point, the position B2 of the target node acquired at the third time needs to be translated to the position B1 of the target node acquired at the second time, so that B1 and B2 overlap. At present, although the coordinates of B2 and B1 cannot be determined, the direction and distance of the movement of B2 relative to B1 can be acquired. That is, the movement vector of the position of the target node when the real-time position information is acquired at the third time relative to the position of the target node when the real-time position information is acquired at the second time is $\bar{m}$. Therefore, if B2 translates to B1, the corresponding translation amounts of A2 and B2 are the same in order to keep the position relationship between A2 and B2 unchanged. That is, according to the direction and distance (i.e., the movement vector $\bar{m}$) of the movement of the target node in the real-time position information acquired at the third time relative to the position of the target node of the real-time position information acquired at the second time, the coordinate corresponding to the position of the source node acquired at the third time can be translated to A2', so as to obtain the translation coordinate of the source node (i.e., the coordinate of A2'). By enabling B2 and B1 to overlap, and by equating the position relationship of A2' with B1 (i.e., translated B2) to the position relationship of A2 with B2, the translated source node A2' can serve as a new reference point for positioning the target node.

Repeating the step S42 to obtain the translation coordinates corresponding to the position of the source node in each of the real-time position information acquired for multiple times. Specifically, the coordinate of the source node A3 in the real-time position information acquired at the fourth time are translated in the coordinate system according to the direction and distance of the movement of the target node relative to the position acquired at the third time, so as to obtain the translation coordinate of the source node A3'. As such, A3' can serve as a new reference point for positioning the target node. By analogy, translation coordinates corresponding to the translated source node position in the real-time position information acquired for multiple times can be determined, and the translated target node positions overlap with each other, so that a plurality of reference points are obtained for positioning the target nodes.

Step S43, calculating coordinates corresponding to the position of the target node according a preset algorithm and the translation coordinates corresponding to the position of the source node and the distance between the source node and the target node in the real-time position information acquired for multiple times, so as to position the target node.

FIG. 7 is a schematic diagram of three-point positioning. As shown in FIG. 7, a plurality of translated source nodes obtained in step S42 are serve as reference points, and the translation coordinates of the translated source nodes can be determined, and the distance between the source node respectively corresponding to each of the reference points (the translated source nodes) and the target node can also be determined. By serving each of the reference points (translation coordinates of the source node) as the center of the circle, and the distance between the source node corresponding to the above reference point and the target node as the radius, the circumference of a circle at the position of the target node can be determined. In FIG. 7, taking to positioning the target node B1 by reference points A1, A2', and A3' as an example. Taking reference points A1, A2', and A3' as the center of the circle respectively, and correspondingly determining a plurality of circles with the distance d1 between the source node corresponding to reference point A1 to the target node as the radius, with the distance d2 between the source node corresponding to reference point A2' to the target node as the radius, and with the distance d3 between the source node corresponding to reference point A3' to the target node as the radius. There is an overlap area between the plurality of circles. The overlap area of the plurality of circles is the area where the target node (e.g., B1 in FIG. 7) is located. If there are more reference points, the more accurate the position of the calculated reference point is.

Optionally, after the coordinate system is established and the translation coordinate of the original coordinate in the real-time position information acquired at each time is obtained in steps S41 to S42, in step S43, the coordinate (x, y, z) corresponding to the position of the target node can be determined according to the Pythagorean theorem and the preset algorithm shown in the following set of equations:

$$(x - x_1)^2 + (y - y_1)^2 + (z - z_1)^2 = d_1^2$$
$$(x - x_2)^2 + (y - y_2)^2 + (z - z_2)^2 = d_2^2$$
$$(x - x_3)^2 + (y - y_3)^2 + (z - z_3)^2 = d_3^2$$
$$\cdots$$
$$(x - x_n)^2 + (y - y_n)^2 + (z - z_n)^2 = d_n^2$$

In this case, $x_1$, $x_2$, . . . and $x_n$ are the horizontal coordinates of the translation coordinates corresponding to the position of the source node in the real-time position information acquired at each time, $y_1$, $y_2$, . . . and $y_n$ are the longitudinal coordinates of the translation coordinates corresponding to the position of the source node the real-time position information acquired at each time, $z_1$, $z_2$, . . . and $z_n$ vertical axis coordinates of translation coordinates corresponding to the position of the source node the real-time position information acquired at each time; $d_1$, $d_2$ . . . and $d_n$ are the distance between the source node and the target node in the real-time position information acquired at each time; and x, y and z are respectively horizontal axis coordinate, longitudinal axis coordinate and vertical axis coordinate corresponding to the position of the target node.

It should be noted that, if the target node and the source node are located at the same altitude, that is, the target node and the source node are regarded as being located in the same plane, the position relationship between the two nodes can be established as a plane coordinate system, and the above formula can eliminate the related term of the vertical axis z. In the plane coordinate system, at least initial position information and two times of real-time position information (three equations) need to be acquired, such that the target node can be positioned. If the target node and the source node are located at different altitudes, the position relationship of the two nodes can be established as a spherical coordinate system. In the spherical coordinate system, at least initial position information and three times of real-time position information (four equations) need to be acquired, such that the target node can be positioned.

After the coordinates (x, y, z) of the target node are obtained according to the above equations, the position of the target node relative to the source node can be obtained, and the target node can be positioned. In the positioning method according to the present embodiment, by using the source nodes at different positions as the reference points, the target node can be positioned based on the three-point positioning principle only by using the source node as the reference points.

Figure 8:
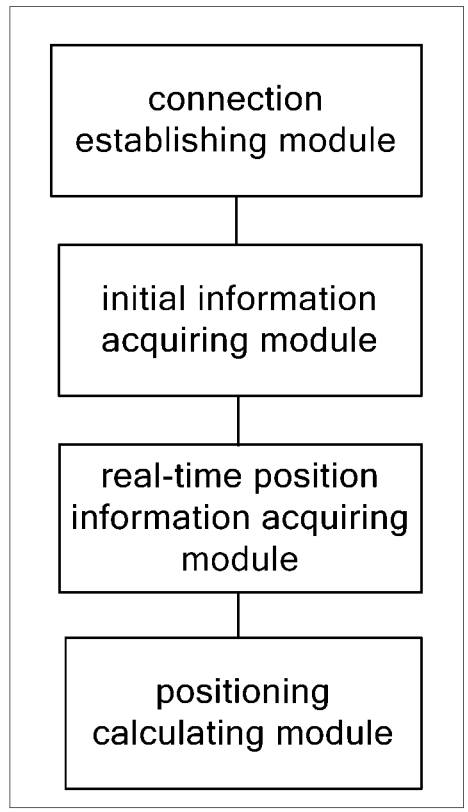
FIG. 8 is a schematic structural diagram of a positioning device according to an embodiment of the present disclosure.

FIG. 8 is a schematic structural diagram of a positioning device according to an embodiment of the present disclosure. As shown in FIG. 8, the positioning device comprises: a connection establishing module, an initial information acquiring module, a real-time position information acquiring module and a positioning calculating module.

Specifically, the connection establishing module is configured to establish a connection with the target node in response to the feedback information returned by the target node according to a positioning request sent by the source node. The initial information acquiring module is configured to acquire initial position information, wherein the initial position information comprises an initial position of a source node and a distance between the source node and a target node. The real-time position information acquiring module is configured to acquire real-time position information after the initial position information acquiring module acquires the initial position information, wherein the real-time position information comprises the direction and the distance of the movement of the source node relative to the last position of the source node, the direction and the distance of the movement of the target node returned by the target node relative to the last position of the target node, and the distance between the target node and the source node. The last position information of the source node and the target node can be acquired by the initial information acquiring module or the real-time position information acquiring module. The positioning calculating module is configured to position the target node according to the initial position information acquired by the initial information acquiring module, and the real-time position information acquired by the real-time position information acquiring module for multiple times. In this case, in each acquired real-time position information, at least one of the following position information is different from the corresponding position information acquired last time: the direction of the movement of the source node relative to the last position of the source node, the distance of the movement of the source node relative to the last position of the source node, the direction of the movement of the target node relative to the last position of the target node, and the distance of the movement of the target node relative to the last position of the target node.

Optionally, the positioning request sent by the source node can be sent through the connection establishing module. The connection establishing module can further receive feedback information returned by the target node in response to the positioning request, and establish connection with the target node according to the feedback information.

Optionally, the initial information acquiring module or the real-time position information acquiring module sends a first measurement signal to the target node and receives a first reply signal, wherein the first reply signal is a signal returned by the target node after the target node receiving the first measurement signal. The positioning calculating module is further configured to acquire a first transceiving time length, wherein the first transceiving time length is the time length from the sending of the first measurement signal to the receiving of the first reply signal. The positioning calculating module is further configured to determine the distance between the source node and the target node according to the first transceiving time length and the transmission speeds of the first measurement signal and the first reply signal.

Optionally, the initial information acquiring module or the real-time position information acquiring module is further configured to send the second measurement signal to the target node according to a preset sending interval duration. the initial information acquiring module or the real-time position information acquiring module is further configured to receive a first receiving time length returned by the target node, wherein the first receiving time length is determined by the target node and is the time length between the target node receiving the first measurement signal and the target node receiving the second measurement signal. The positioning calculating module is further configured to compare the first receiving time length with the sending interval duration, and determine a first time difference between the source node and the target node for sending and receiving signals.

Optionally, the initial information acquiring module or the real-time position information acquiring module is further configured to receive a second reply signal, wherein the second reply signal is a signal sent by the target node at an interval of a preset sending interval duration after the first reply signal is sent. The positioning calculating module is further configured to determine a second receiving time length, wherein the second receiving time length is a time length between receiving the first reply signal and receiving the second reply signal. The positioning calculating module is further configured to compare the second receiving time length with the sending interval duration, and determine a second time difference between the source node and the target node for sending and receiving signals.

Optionally, the positioning calculating module is further configured to: establish a coordinate system with the acquired initial position of the source node as the origin; determining the coordinate corresponding to the acquired position of the source node according to the acquired direction and distance of the movement of the source node relative to the last position of the source node, and translate the coordinate of the source node according to the direction and distance of the movement of the target node relative to the last position of the target node, so as to obtain the translation coordinate of the source node; obtain translation coordinates corresponding to each of the source nodes based on the real-time position information acquired each time; and calculate coordinates corresponding to the position of the target node according a preset algorithm and the translation coordinates corresponding to the position of the source node and the distance between the source node and the target node in the real-time position information acquired for multiple times, so as to position the target node.

Optionally, the preset algorithm adopted by the positioning calculating module is an equation described in the above positioning method embodiment.

As shown in FIG. 1, an embodiment of the present disclosure further provides a positioning system, which comprises the above positioning device.

As shown in FIG. 1, taking two user equipments (UE 1 and UE 2) to perform positioning as an example, a first user equipment UE1 comprises a source node (positioning node), and a second user equipment UE2 comprises a target node (positioned node). Both the source node and the target node have the functions of radio frequency signal transmission and radio frequency signal reception.

Figure 9:
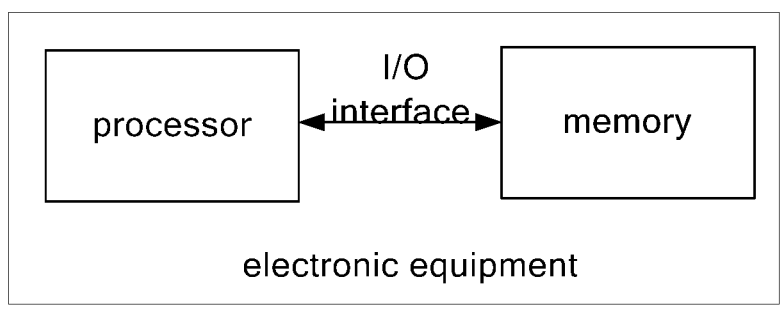
FIG. 9 is a block diagram of an electronic equipment according to an embodiment of the present disclosure.

FIG. 9 is a block diagram of an electronic equipment according to an embodiment of the present disclosure. As shown in FIG. 9, the electronic equipment comprises:
one or more processors;
a memory storing one or more programs, when the one or more programs is executed by the one or more processors, to implement any of the above positioning methods by the one or more processors;
and one or more I/O interfaces connected between the processor and the memory, and the I/O interface is configured to realize the information interaction between the processor and the memory.

In this case, the processor is an apparatus with data processing capability, which comprises but is not limited to a Central Processing Unit (CPU) and the like. the memory is an apparatus with data storaging capability, which comprises but not is limited to, random access memory (RAM, more specifically, SDRAM, DDR, etc.), Read Only Memory (ROM), Electrically Erasable Programmable Read Only Memory (EEPROM), and FLASH memory (FLASH); and the I/O interface (read/write interface) is connected between the processor and the memory, and is configured to implement information interaction between the memory and the processor, which comprises but is not limited to a data Bus (Bus) and the like.

Figure 10:
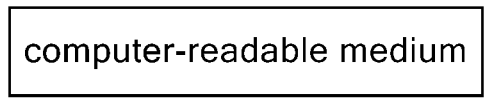
FIG. 10 is a block diagram of a computer-readable medium according to an embodiment of the present disclosure.

FIG. 10 is a block diagram of a computer-readable medium according to an embodiment of the present disclosure. As shown in FIG. 10, the computer readable medium stores a computer program, and the program realizes any one of the positioning methods described above when executed by a processor.

A person skilled in the art will appreciate that all or some of the steps, systems, functional modules/units in the devices, disclosed above can be implemented as software, firmware, hardware, and suitable combinations thereof.

In a hardware implementation, the division between functional modules/units mentioned in the above description does not necessarily correspond to the division of physical components; for example, one physical component can have multiple functions, or one function or step can be performed by several physical components in cooperation.

Some or all of the physical components can be implemented as software executed by a processor, such as a Central Processing Unit (CPU), digital signal processor, or microprocessor, or as hardware, or as an integrated circuit, such as an application specific integrated circuit. Such software can be distributed on computer readable medium, which can comprise computer storage medium (or non-transitory medium), and communication medium (or transitory medium). The term computer storage medium comprises volatile and nonvolatile, removable and non-removable medium implemented in any method or technology for storage of information such as computer readable instructions, data structures, program modules or other data, as is well known to those skilled in the art. Computer storage medium comprises, but is not limited to, random access memory (RAM, more specifically SDRAM, DDR, etc.), Read Only Memory (ROM), Electrically Erasable Programmable Read Only Memory (EEPROM), FLASH memory (FLASH), or other disk storage memory; compact disk read only memory (CD-ROM), Digital Versatile Disk (DVD), or other optical disk storage; magnetic cassettes, magnetic tape, magnetic disk storage or other magnetic storage memory; any other medium which can be used to store the desired information and which can be accessed by a computer. In addition, communication media typically embodies computer readable instructions, data structures, program modules or other data in a modulated data signal such as a carrier wave or other transport mechanism and comprises any information delivery media as is well known to those skilled in the art.

It is to be understood that the above embodiments are merely exemplary embodiments adopted to illustrate the principles of the disclosed embodiments, and that the disclosed embodiments are not limited thereto. It will be apparent to those skilled in the art that various modifications and improvements can be made without departing from the spirit and scope of the embodiments of the present disclosure, and such modifications and improvements are also considered to be within the scope of the embodiments of the present disclosure.

What is claimed is:

1. A positioning method, comprising:
establishing, in response to feedback information returned by the target node according to a positioning request sent by a source node, connection with a target node;
acquiring initial position information, wherein the initial position information comprises the initial position of the source node and the distance between the source node and the target node;
acquiring real-time position information for multiple times, wherein each of the real-time position information comprises: the direction and the distance of the movement of the source node relative to the last position of the source node, the direction and the distance of the movement of the target node returned by the target node relative to the last position of the target node, and the distance between the target node and the source node, wherein the last position information of the source node and the target node is acquired through the following steps: (a) step of acquiring the initial position information, or (b) acquiring real-time position information at the last time; and
positioning the target node according to the acquired initial position information and at least two of the real-time position information acquired for multiple times; wherein
in each acquired real-time position information, at least one of the following position information is different from the corresponding position information acquired last time: the direction of the movement of the source node relative to the last position of the source node, the distance of the movement of the source node relative to the last position of the source node, the direction of the movement of the target node relative to the last position of the target node, and the distance of the movement of the target node relative to the last position of the target node.

2. The positioning method of claim 1, wherein, establishing, in response to feedback information returned by the target node according to a positioning request sent by a source node, connection with a target node comprises:
sending a positioning request to a measurement range; and
receiving feedback information returned by the target node in response to the positioning request, and establishing connection with the target node according to the feedback information.

3. The positioning method of claim 2, wherein, in the step of sending a positioning request to a measurement range, a first range value, a first positioning manner and a second positioning manner are set, wherein a positioning range of the first positioning manner is larger than a positioning range of the second positioning manner,
if the measurement range is larger than the first range value, the first positioning manner is used to send the positioning request, and if the measurement range is smaller than the first range value, the second positioning manner is used to send the positioning request.

4. The positioning method of claim 3, wherein, in the step of sending a positioning request to a measurement range, a second range value, a manner and a third positioning manner are set, wherein a positioning range of the third positioning manner is larger than a positioning range of the second positioning manner,
if the measurement range is larger than the first range value, the first positioning manner is used to send the positioning request, if the measurement range is smaller than the first range value and greater than the second range value, the second positioning manner is used to send the positioning request, and if the measurement range is smaller than the second range value, the third positioning manner is used to send the positioning request.

5. The positioning method of claim 1, wherein, in the step of acquiring real-time position information for multiple times, acquiring the distance between the target node and the source node further comprises:
sending a first measurement signal to the target node;
receiving a first reply signal, wherein the first reply signal is a signal returned by the target node after receiving the first measurement signal;
acquiring a first transceiving time length, wherein the first transceiving time length is the time length from the sending of the first measurement signal to the receiving of the first reply signal; and
determining, according to the first transceiving time length and the transmission speeds of the first measurement signal and the first reply signal, the distance between the source node and the target node.

6. The positioning method of claim 5, wherein,
after the step of sending the first measurement signal to the target node, further comprising:
sending a second measurement signal to the target node at a first sending interval duration;
receiving a first receiving time length returned by the target node, wherein the first receiving time length is determined by the target node and is the time length between the target node receiving the first measurement signal and the target node receiving the second measurement signal; and
comparing the first receiving time length with the first sending interval duration, and determining a first time difference between the source node and the target node for sending and receiving signals.

7. The positioning method of claim 6, wherein,
after the step of comparing the first receiving time length with the first sending interval duration, and determining a first time difference between the source node and the target node for sending and receiving signals, further comprising:
receiving a second reply signal, wherein the second reply signal is a signal sent by the target node at an interval of a second sending interval duration after the first reply signal is sent;
determining a second receiving time length, wherein the second receiving time length is a time length between receiving the first reply signal and receiving the second reply signal; and
comparing the second receiving time length with the second sending interval duration, and determining a second time difference between the source node and the target node for sending and receiving signals.

8. The positioning method of claim 1, wherein, positioning the target node according to the acquired initial position information and at least two of the real-time position information acquired for multiple times further comprises:
establishing a coordinate system with the acquired initial position of the source node as the origin;
determining the coordinate corresponding to the acquired position of the source node according to the acquired direction and distance of the movement of the source node relative to the last position of the source node, and translate the coordinate of the source node according to the direction and distance of the movement of the target node relative to the last position of the target node, so as to obtain the translation coordinate of the source node;
repeating the last step, and obtaining translation coordinates corresponding to each of the source nodes based on the real-time position information acquired each time;
calculating, according a first algorithm, and the translation coordinates corresponding to the position of the source node and the distance between the source node and the target node in the real-time position information acquired for multiple times, coordinates corresponding to the position of the target node, so as to position the target node.

9. The positioning method of claim 8, wherein, the first algorithm is the following system of equations:

$$(x - x1)2 + (y - y1)2 + (z - z1)2 = d12$$

$$(x - x2)2 + (y - y2)2 + (z - z2)2 = d22$$

$$(x - x3)2 + (y - y3)2 + (z - z3)2 = d32$$

$$\cdots$$

$$(x - xn)2 + (y - yn)2 + (z - zn)2 = dn2$$

wherein x1, x2, . . . xn, and y1, y2, . . . yn, and z1, z2, . . . zn are respectively horizontal, longitudinal, and vertical axis coordinates of a translation coordinate corresponding to the position of the source node in the acquired real-time position information; d1, d2 . . . and do are the distance between the source node and the target node in the real-time position information acquired at each time; and x, y and z are respectively horizontal axis coordinate, longitudinal axis coordinate and vertical axis coordinate corresponding to the position of the target node.

10. The positioning method of claim 9, wherein, in the set of equations of the first algorithm, n=3, and the first algorithm is the following system of equations:

$$(x - x1)2 + (y - y1)2 + (z - z1)2 = d12$$
$$(x - x2)2 + (y - y2)2 + (z - z2)2 = d22$$
$$(x - x3)2 + (y - y3)2 + (z - z3)2 = d32.$$

11. An electronic equipment, comprising:
one or more processors;
a memory storing one or more programs, when the one or more programs is executed by the one or more processors, to implement the positioning method of claim 1 by the one or more processors; and
and one or more I/O interfaces connected between the processor and the memory, and the I/O interface is configured to realize the information interaction between the processor and the memory.

12. The electronic equipment of claim 11, wherein, in the positioning method implemented by the one or more processors, establishing, in response to feedback information returned by the target node according to a positioning request sent by a source node, connection with a target node comprises:
sending a positioning request to a measurement range; and
receiving feedback information returned by the target node in response to the positioning request, and establishing connection with the target node according to the feedback information.

13. The electronic equipment of claim 12, wherein, in the positioning method implemented by the one or more processors, in the step of sending a positioning request to a measurement range, a first range value, a first positioning manner and a second positioning manner are set, wherein a positioning range of the first positioning manner is larger than a positioning range of the second positioning manner,
if the measurement range is larger than the first range value, the first positioning manner is used to send the positioning request, and if the measurement range is smaller than the first range value, the second positioning manner is used to send the positioning request.

14. The electronic equipment of claim 13, wherein, in the positioning method implemented by the one or more processors, in the step of sending a positioning request to a measurement range, a second range value, a manner and a third positioning manner are set, wherein a positioning range of the third positioning manner is larger than a positioning range of the second positioning manner,
if the measurement range is larger than the first range value, the first positioning manner is used to send the positioning request, if the measurement range is smaller than the first range value and greater than the second range value, the second positioning manner is used to send the positioning request, and if the measurement range is smaller than the second range value, the third positioning manner is used to send the positioning request.

15. The electronic equipment of claim 11, wherein, in the positioning method implemented by the one or more processors, in the step of acquiring real-time position information for multiple times, acquiring the distance between the target node and the source node further comprises:
sending a first measurement signal to the target node;
receiving a first reply signal, wherein the first reply signal is a signal returned by the target node after receiving the first measurement signal;
acquiring a first transceiving time length, wherein the first transceiving time length is the time length from the sending of the first measurement signal to the receiving of the first reply signal; and
determining, according to the first transceiving time length and the transmission speeds of the first measurement signal and the first reply signal, the distance between the source node and the target node.

16. The electronic equipment of claim 15, wherein, in the positioning method implemented by the one or more processors,
after the step of sending the first measurement signal to the target node, further comprising:
sending a second measurement signal to the target node at a first sending interval duration;
receiving a first receiving time length returned by the target node, wherein the first receiving time length is determined by the target node and is the time length between the target node receiving the first measurement signal and the target node receiving the second measurement signal; and
comparing the first receiving time length with the first sending interval duration, and determining a first time difference between the source node and the target node for sending and receiving signals.

17. The electronic equipment of claim 16, wherein, in the positioning method implemented by the one or more processors,
after the step of comparing the first receiving time length with the first sending interval duration, and determining a first time difference between the source node and the target node for sending and receiving signals, further comprising:
receiving a second reply signal, wherein the second reply signal is a signal sent by the target node at an interval of a second sending interval duration after the first reply signal is sent;
determining a second receiving time length, wherein the second receiving time length is a time length between receiving the first reply signal and receiving the second reply signal; and
comparing the second receiving time length with the second sending interval duration, and determining a second time difference between the source node and the target node for sending and receiving signals.

18. The electronic equipment of claim 11, wherein, in the positioning method implemented by the one or more processors, positioning the target node according to the acquired initial position information and at least two of the real-time position information acquired for multiple times further comprises:
establishing a coordinate system with the acquired initial position of the source node as the origin;
determining the coordinate corresponding to the acquired position of the source node according to the acquired direction and distance of the movement of the source node relative to the last position of the source node, and translate the coordinate of the source node according to the direction and distance of the movement of the target node relative to the last position of the target node, so as to obtain the translation coordinate of the source node;

repeating the last step, and obtaining translation coordinates corresponding to each of the source nodes based on the real-time position information acquired each time;

calculating, according a first algorithm, and the translation coordinates corresponding to the position of the source node and the distance between the source node and the target node in the real-time position information acquired for multiple times, coordinates corresponding to the position of the target node, so as to position the target node.

19. The electronic equipment of claim 18, wherein, in the positioning method implemented by the one or more processors, the first algorithm is the following system of equations:

$$(x - x1)2 + (y - y1)2 + (z - z1)2 = d12$$

$$(x - x2)2 + (y - y2)2 + (z - z2)2 = d22$$

$$(x - x3)2 + (y - y3)2 + (z - z3)2 = d32$$

...

$$(x - xn)2 + (y - yn)2 + (z - zn)2 = dn2$$

wherein x1, x2, ... xn, and y1, y2, ... yn, and z1, z2, ... zn are respectively horizontal, longitudinal, and vertical axis coordinates of a translation coordinate corresponding to the position of the source node in the acquired real-time position information; d1, d2 ... and do are the distance between the source node and the target node in the real-time position information acquired at each time; and x, y and z are respectively horizontal axis coordinate, longitudinal axis coordinate and vertical axis coordinate corresponding to the position of the target node.

20. A non-transitory computer-readable storage medium, wherein, the non-transitory computer readable storage medium stored computer program, and the computer program realizes the positioning method according to claim 1 when executed by a processor.

* * * * *